Figure 1:
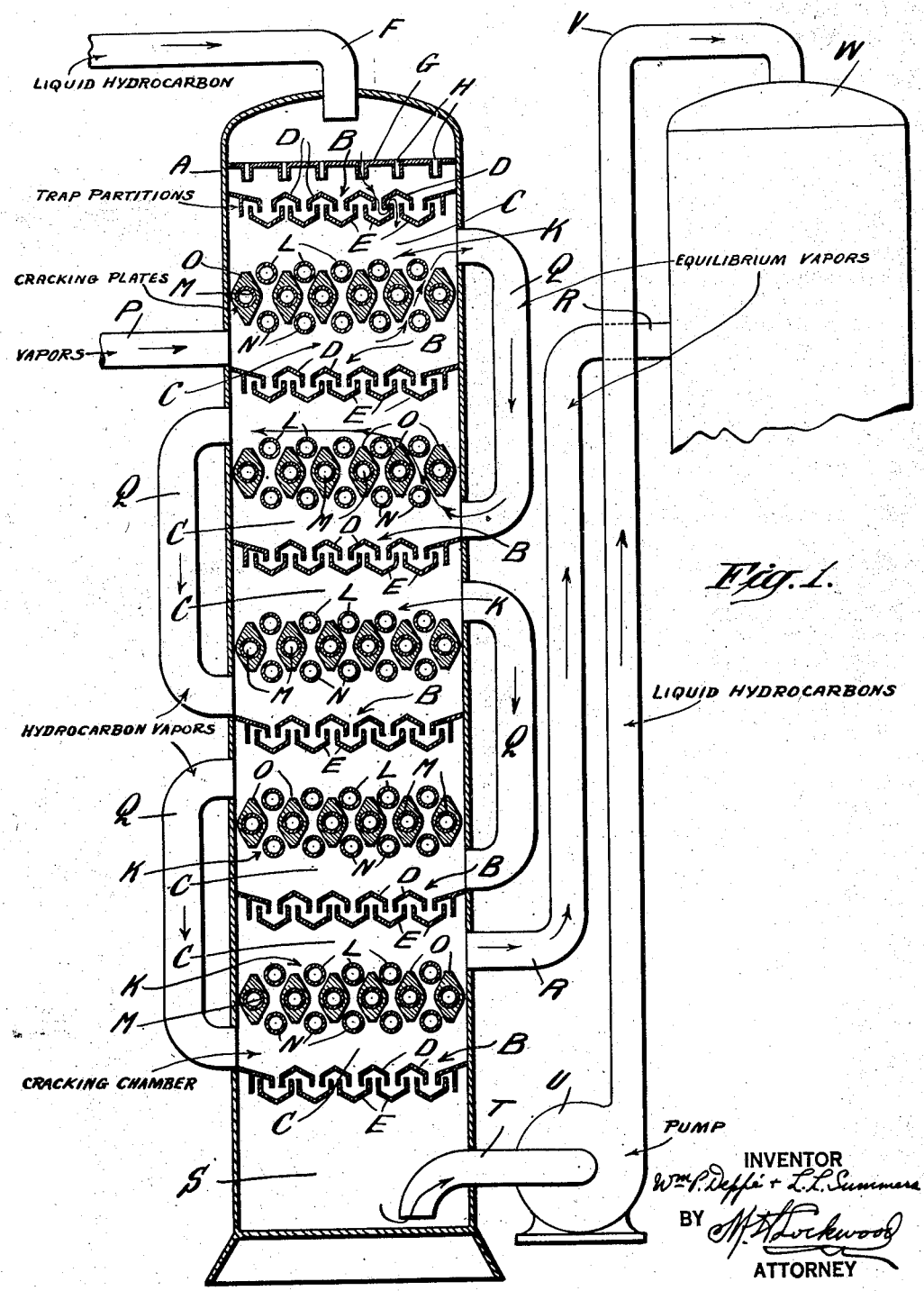

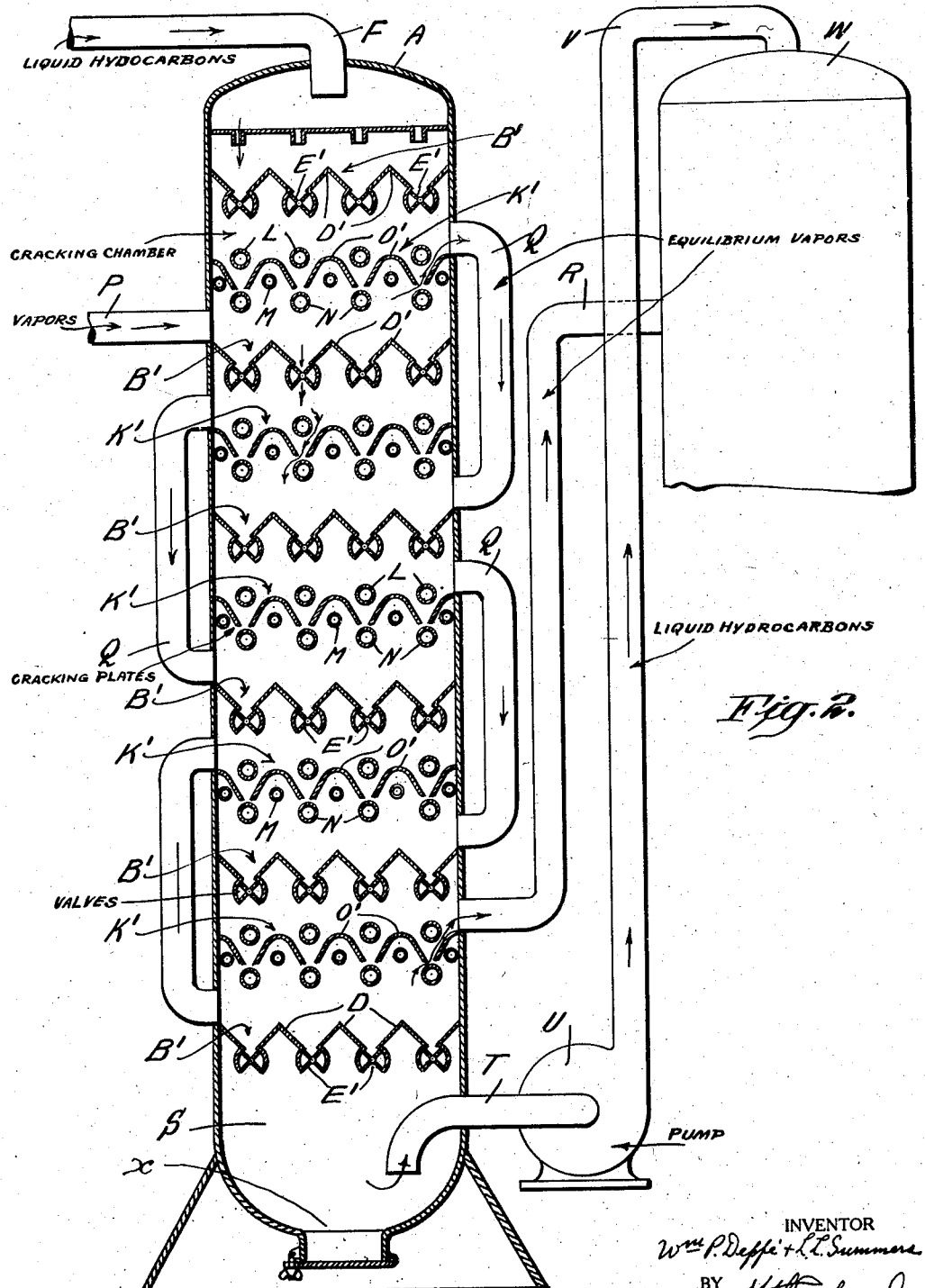

Patented May 12, 1931

1,804,917

UNITED STATES PATENT OFFICE

WILLIAM P. DEPPÉ, OF BRIGHTWATERS, AND LELAND L. SUMMERS, OF NEW YORK, N. Y.; LLEWELLYN L. B. SUMMERS AND ARTHUR YOUNG ADMINISTRATORS OF SAID LELAND L. SUMMERS, DECEASED

CRACKING PROCESS

Application filed February 8, 1924. Serial No. 691,363.

Our invention relates more particularly to an equilibrium cracking process, in which the lighter hydrocarbon vapors are maintained in intimate contact and approximate equilibrium with the liquid hydrocarbons during the cracking operation in contradistinction to prior cracking processes, wherein the distilled and cracked vapors are removed as fast as they are formed during the cracking operation.

Our improved process relates primarily to the production of lighter hydrocarbons from the heavier hydrocarbons by cracking the heavier hydrocarbons, preferably in the liquid film form, in intimate contact with the vapors arising from the liquid hydrocarbons being treated so that an approximate equilibrium will be maintained between the liquid and the vapors while the liquid is undergoing a regulated decomposition, and continuously integrating the liquid and the vapors until a desired quality of vapor at a predetermined temperature is secured, then removing and condensing the vapors.

Our invention is not confined to any particular mixture of liquids, but relates more particularly to a process of cracking petroleum mixtures of various kinds together with other liquids having similar characteristics in the crude form or otherwise, by means of regulating the vapor products arising from these liquids during the process of cracking and distillation. In the practice of our process entirely different products may be secured in the vapor state by controlling the vapors in contact with the liquid before cracking, and during cracking and distillation, and causing the vapors to be intimately mixed or integrated with the liquids from which they are being distilled at the time of cracking. A control is thereby exercised over the compounds formed from the decomposition of the liquid hydrocarbons and similar liquids by causing the decomposition to occur in intimate contact with a vapor atmosphere with which the decomposition products may react and which will determine the character of the vapor released and its reaction with the liquid, the liquid and vapor being in intimate contact and approximating an equilibrium condition.

In general, we prefer to subject the liquid to the action of a heated surface, the liquid being spread out in the form of a film. The heated surface is maintained at sufficient temperature to cause the heavier molecules to be partially broken down or decomposed and we have this decomposition take place in intimate contact with a definite atmosphere of vapor so that a dynamic equilibrium will be set up between the vapor and the liquid and the molecular forces acting between the liquid and the vapor will be utilized to effect decomposition and form substitution compounds, in addition to the heat energy transmitted to the molecules from the heated surface.

We prefer to have the contact of the liquid with the heated surface of short duration, this contact to be repeated frequently at progressive temperatures and preferably approximating a film condition.

We prefer to conduct the cracking or decomposition of the liquid in the presence of a vapor of hydrocarbons, preferably introduced from an outside source in the first stage of heating, so that the decomposition will start not alone in contact with the vapors arising from the liquid being cracked but in addition thereto in a vapor atmosphere of given composition so that an approximate equilibrium with this vapor will be set up. There will be a lower partial pressure of the heavier vapors on the heavier liquids due to the presence of this excess of light vapor, and the lighter products formed by decomposition in the liquid will be held in solution by the partial pressure of the light vapors introduced, so that a saturated vapor atmosphere will exist. A reaction will, therefore, take place between the liquid and the vapors, causing an increased formation of substitution products in the liquid and a continued increase in the formation of compounds of lower boiling points.

Substitution in compounds undergoing decomposition will take place through being in contact with an excess of compounds which may be substituted. We do not in general count on the substitution or addition of hydrogen alone, but of the various hydrocarbon compounds and groups or radicals. We have found that the heavier normal compounds are readily decomposed and that in substituting hydrocarbon compounds, various side-chain hydrocarbons may be produced. The normal compounds of the paraffine and olefine series are counsidered as straight open-chain compounds. Upon substituting side-chains or upon producing isomers of these normal compounds, the boiling points are lowered. Thus normal decane of the paraffine series has the formula

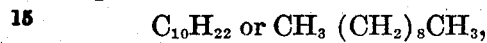

while the isomer diamyl may be written—

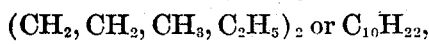

the isomer having a boiling point from 20°–25° F. lower than the normal compound.

In general, therefore, the more hybrid the composition of the molecule, the lower its boiling point and we endeavor to make the condensate product as hybrid as possible, that is, to have as many different types of molecules, and endeavor to make the molecule itself as hybrid as possible through substituting other molecular groups. The effect of this is to lower the boiling point of the products in the liquid, owing to the fact that, where a large number of different hydrocarbons are present in a liquid, that is, where the liquid has a very hybrid character, we have discovered that these various compounds through their chemical similarity and complete miscibility enter the solutions completely and are distributed through their osmotic pressures so that the concentration of any particular compound in the gaseous phase bears a fixed relation to the concentration of this same particular compound in the liquid phase. This relation or ratio between the gaseous and liquid concentrations of the same compound is fixed or definite because it is a point of equilibrium between the liquid and gaseous phases and such an equilibrium is complex in that it is the composite of all the separate equilibria which exist for each molecular species in the gaseous and liquid phases. Therefore the mol fraction or concentration of any particular liquid constituent is proportional to the concentration or partial pressure of that same constituent in the gaseous or vapor phase. Hence, the greater the number of these different molecular species present for a given average molecular weight, the lower will be the partial pressure of each particular molecular species and, therefore, the lower the boiling point will be for a given pressure.

It will be understood that, in general, the reactions have an increased velocity at the phase surface and it is possible to have a greater uniformity of heat transmission and heat absorption in film surfaces than in liquid masses, therefore, as the surfaces of the liquid exposed to heat and to the action of the vapors is increased in the film form, we endeavor to approximate film surfaces in the general operation of our process. The absence of liquid masses is also a factor of safety if a pressure higher than atmospheric is applied to the system, and we contemplate operating the system either at atmospheric or higher pressure or subjecting it to the pressure created by the vapors, as may be desired, dependent upon the particular characteristics of the liquid being treated.

We have found that in applying heat to pertoleum products, the presence of lighter components tends to absorb some of the heat applied and to protect the heavier molecules from pronounced decomposition by reason of the fact that there is an average molecular weight set up between the heavier molecules and the lighter molecules and the tendency of the lighter molecules to vaporize must first be overcome before the heat is available for decomposition.

A liquid hydrocarbon which has been freed from the lighter molecules is more susceptible to decomposition by heat than one in which lighter hydrocarbon molecules are continually driven back into the solution, so that, by taking advantage of this property, it is possible to control the degree of decomposition through continually driving into the solution lighter components. We do not in general, therefore, attempt to crack the liquid to fixed carbon products, but prefer to break down the open chains and the polymerized products and to substitute products of the vapors while this breaking down is being accomplished. By controlling the cracking temperatures and the vapors present, we can avoid the heavy carbonizing action in the stills and such carbon as may be produced is carried in a colloidal form or in the form of very light products which will be carried by the solution and discharged in the proper place so that carbonization of the tubes or other heating surfaces is in general to be avoided.

We have obtained satisfactory results from our process with apparatus of various kinds, and, therefore, we are not limited to any particular apparatus or method of integrating the vapors and liquid undergoing decomposition, but for the purpose of illustration we have shown in the accompanying drawings forms of apparatus capable of carrying out our process and producing the results described. We do not limit ourselves to any particular form of transmitting heat to the heating surfaces as this may be done by hot liquids, by means of superheated steam, or by direct fire tubes, as the particular requirements may demand. Fig. 1 shows in vertical section one form of cracking still or column adapted for carrying out our process, and Fig. 2 shows a modified form for the same purpose.

Referring to the drawings and more particularly to Fig. 1, it will be seen that in this form of our cracking still, the still or column A is preferably provided with a plurality of trap-like partitions B, which divide the column into a plurality of retort chambers C. The trap partitions B comprise cap members D and oil receptacles E, arranged alternately as illustrated, so that the liquid petroleum or hydrocarbons to be cracked can flow down through the partitions B, but vapors are prevented from passing therethrough by the traps. The hydrocarbon oils to be cracked are admitted to the top of the column through a pipe F and preferably fall on a distributing plate G, and through openings H therein are distributed over the first trap partition B.

Each of the retort chambers C is provided with a cracking or heating plate K which comprises a plurality of layers of heating pipes L, M and N, which are preferably staggered in a vertical direction. By this arrangement the hydrocarbon oils to be cracked falling from the trap B on to the heated pipes will be distributed thereover in thin films. Preferably the heating pipes M are provided with vertically elongated fins or collars O of cast iron, aluminum or porcelain tile, for providing additional heating surfaces over which the hydrocarbon oils to be cracked will spread, as the latter pass downward through the retort cracking plate K. It will be seen that by this arrangement, the petroleum oils to be cracked will be spread out in thin films over the highly heated pipes and film surfaces. The pipes L, M and N may be heated to the cracking temperatures required for the oils being treated, by superheated steam, hot liquids or they may be used as fire tubes.

The cracking plates K comprising the plurality of heating tubes or coils L, M and N may be considered as equilibrium plates in that, in our process, the liquids and vapors in the retort chambers C are preferably kept in close contact and integrated with the liquid hydrocarbons being cracked under approximate equilibrium conditions. In this connection, and in order that the liquids being treated may be subjected to the influence of light hydrocarbon vapors, in approximate equilibrium, light hydrocarbon vapors from an outside source or from another cracking column are preferably introduced to the uppermost retort chamber C through a pipe P, which enters the retort chamber C below the equilibrium or cracking plate K, so that the light vapors are compelled to come into intimate contact with the liquid hydrocarbon films on the surfaces of the pipes L and N and the film on the surface of the sleeve castings O. Therefore, the vapors in passing through the cracking plate will be intimately integrated with the liquid hydrocarbons and the partial vapor pressures of the various fuel constituents will establish approximate equilibrium between the vapors given off by cracking or distillation of the highly heated filmed liquid.

The vapors from the uppermost and each succeeding retort chamber C are then conducted downward through pipes Q to the next succeeding retort chamber where, in each of which, the vapors are again forced to pass through the cracking plate K in intimate contact with the liquid petroleum or hydrocarbon oils and become integrated therewith. It will be noted that for this purpose the pipes Q extend from above the cracking plate K of one retort chamber to a point below the cracking plate of the next lower chamber, thus providing for conducting the highly heated hydrocarbon vapors from the upper portion of one retort chamber C to the lower portion of the succeeding retort chamber. In this manner, the entire vapor constituent from the cracking and distillation taking place in each retort chamber is compelled to become intimately integrated with the liquid hydrocarbons, as the latter pass downward by gravity flow, through the trap plates B, and at each cracking stage the vapors are in approximate equilibrium with the liquids being cracked. The vapors from the lowermost retort chamber C of the column may be conducted to a condenser and liquefied for the final product or conducted through a pipe R to the uppermost retort chamber of an adjacent cracking column, substantially as illustrated in Fig. 1 of the drawings, and the operation repeated. Likewise, the liquid petroleum or hydrocarbon oils reaching the bottom chamber S of the column may be drawn off through pipe T by a pump U and conducted through a pipe V to an adjacent cracking still W, where the cracking operations may be continued in the presence of the light hydrocarbon vapors, substantially as described for the first still A. Obviously, however, if the cracking operation is completed in a single column, the vapors from the pipe R are conducted to a condenser (not shown) and the product obtained therefrom.

The height of the column and the number of retort chambers and cracking plates therein may, therefore, be varied according to the treatment it is desired to give the liquid petroleum or hydrocarbon oils and whether or not more than one column is to be used. An important feature of our process is that it is preferably carried out with progressive or step by step increase of the temperatures to which the hydrocarbon oils to be cracked are submitted. In other words, we have found it preferable and desirable to start with a minimum cracking temperature in the cracking plate in the uppermost retort chamber of the column and increase the temperatures by predetermined amounts in the succeeding cracking stages. This staging up of the successive cracking plates may be continued through several columns, if more than one is used, but it should be borne in mind that at each cracking stage, the liquid and vapor components are maintained in intimate contact and the vapors thoroughly integrated with the liquid to maintain approximate equilibrium therebetween. It will be understood also that our cracking process may be operated at substantially atmospheric pressure, or under certain conditions, may be operated under several atmospheres or even higher pressures.

It will be noted that in the form of apparatus shown in Fig. 1 of the drawings, the traps E of the partitions B form pockets or troughs for the accumulation of the hydrocarbon oils, and while this arrangement prevents the passage of vapors from one retort chamber to another, it is desirable to avoid pockets or devices of this character, where the oils being treated may accumulate. In order to overcome this objection, we have shown in Fig. 2 a modified apparatus for carrying out our equilibrium cracking process, in which the cracking plates K are slightly modified and a valve scheme substituted for the trap plates B, these modifications being designated respectively at K' and B' of Fig. 2. The remaining portions of the column shown in Fig. 2 are substantially like those shown in Fig. 1 and corresponding parts are indicated by the same reference characters. The heating pipes or coils L, M and N for each cracking plate K' are substantially the same as those shown in Fig. 1 and arranged in the same staggered relation, but instead of the vertically disposed fin sleeves O on the pipes M, inverted V-shaped castings O' are mounted over the heating pipes M and adapted to film the hydrocarbon oils passing thereover. The vapors admitted to the retort chamber C will pass upward between the heating pipes and over the films of oil, not only on the pipes L and N, but on the upper surfaces of the film plates O'.

The partitions B', separating the retort chambers as shown in Fig. 2 of the drawings, preferably comprise wedge-shaped members D', adapted to collect the hydrocarbon oils falling from the cracking plates K' and conduct them to valves E', which are preferably rotatable trap valves, substantially as indicated, so that the liquids accumulating above the valves may be transferred through the plates continuously, without permitting the vapors to pass through, by rotation of the valves. Obviously, the valves E' may be rotated intermittently or continuously, as may be desired. It will be seen that this arrangement prevents the accumulation of hydrocarbon oils in pockets and all of the material under treatment is subjected successively to the cracking temperatures in the retort chambers. In this form of apparatus, it will be seen that the liquid petroleum or hydrocarbon oils to be cracked are flowed by gravity down through the column from retort chamber to retort chamber, and simultaneously the vapors are transferred through pipes Q from one retort chamber to the succeeding chamber. In each retort chamber the vapors are brought into intimate contact with the liquids during the cracking operation and thoroughly integrated therewith under approximate equilibrium conditions. Obviously, each of the columns may be provided with a depressed pocket X, as shown in Fig. 2, at the bottom of the column, for the accumulation of sludge consisting of the heavier constituents and solid particles resulting from the cracking process, and these may be removed in any suitable manner.

Obviously, in view of the novelty of our improved equilibrium cracking process, we are not limited to any specific form of apparatus for carrying out the process and obtaining the equilibrium product therefrom, and it will be understood that while we have shown forms of apparatus capable of operating according to our improved process, we do not wish to be limited to specific details thereof, for various modifications, both in the operation and apparatus may be made without departing from the spirit and scope of the invention.

We claim:—

1. The process of cracking petroleum, which comprises introducing the liquid hydrocarbons to be cracked into a retort chamber at the upper end of a column, spreading said liquid in thin films over highly heated plates in said chamber, introducing vapors of hydrocarbons into said chamber, integrating said vapors with the liquid hydrocarbons while maintaining approximate equilibrium therebetween, then passing the liquid hydrocarbons and vapors into a second retort chamber lower down in the column, and repeating the operation.

2. An equilibrium process of cracking liquid hydrocarbons, which comprises flowing the liquid hydrocarbons over surfaces heated to cracking temperatures, while simultaneously integrating therewith hot hydrocarbon vapors of predetermined composition adapted for controlling the cracked product, said vapors being maintained in contact with the liquids and in approximate equilibrium therewith, then repeating said heating and integration of the liquids and vapors a plurality of times at successively increasing temperatures.

3. The process of cracking liquid hydrocarbons, which comprises filming the liquid hydrocarbons over heated cracking plates in a plurality of closed chambers, in which the temperatures of the cracking plates are increased progressively in successive chambers, integrating vapors resulting from cracking and partial pressure vaporization of the liquid hydrocarbons, with the liquid hydrocarbons as they are subjected to cracking temperatures in the successive chambers, while maintaining approximate equilibrium therebetween, the liquid hydrocarbons and the vapors in approximate equilibrium therewith being successively transferred from chamber to chamber and each being subjected to progressively increasing cracking temperatures until the vapors, in dynamic equilibrium with the liquids, attain the desired composition, then removing and condensing them.

4. The process of cracking petroleum, which comprises flowing liquids and vapors in parallel through successive retort compartments, filming the liquids in the presence of all the vapors while maintaining substantial equilibrium therebetween by successively integrating the liquids and vapors, said vapors constituting residual vapors introduced from preceding compartments and newly formed vapors originating in the successive compartments, and continuously subjecting the filmed liquids and the vapors to cracking temperatures.

5. The process of cracking petroleum products, which comprises flowing liquid products through successive cracking compartments in parallel with hydrocarbon vapors, filming the liquids and integrating the vapors therewith at cracking temperatures, said vapors constituting residual vapors from preceding compartments mixed with vapors originating in the successive compartments, increasing the temperature of the liquids and vapors during the parallel flow thereof while maintaining substantial equilibrium therebetween.

6. The process of cracking liquid hydrocarbons, which comprises parallel flowing of hydrocarbon liquids and vapors in substantial equilibrium through a plurality of successive cracking compartments, filming the liquid hydrocarbons in the successive compartments, integrating the vapors with the liquids, said vapors constituting residual vapors from preceding compartments mixed with vapors originating in the successive compartments, subjecting the liquids and vapors to cracking temperatures, and progressively raising the temperature of the liquids and vapors in parallel through successive compartments.

7. The process of cracking petroleum products, which comprises flowing liquids and vapors, in parallel through cracking compartments, maintaining the liquids and vapors at cracking temperatures and progressively increasing the temperature in the parallel flow thereof, successively filming the liquids and integrating the vapors therewith, while maintaining substantial equilibrium therebetween, the vapors constituting residual vapors from preceding compartments mixed with the vapors originating in the successive compartments.

8. The process of cracking petroleum hydrocarbons, which comprises flowing liquid hydrocarbons and vapors thereof in parallel, maintaining the liquids and vapors at cracking temperatures, progressively increasing the temperatures in the direction of parallel flow, successively filming the liquids in the presence of the vapors and integrating the vapors and liquids, said vapors constituting residual vapors from each preceding integration in parallel flow with the liquids and vapors originating from cracking and vaporization of the liquids by successive filming and integration at cracking temperatures.

9. The process of cracking liquid hydrocarbons, which comprises introducing liquids and vapors into a retort, flowing the liquids and vapors therethrough in parallel, successively filming the liquids, maintaining the liquids and vapors at cracking temperatures, said vapors including the vapors introduced and vapors originating within the retort, successively integrating the vapors and filmed liquids and maintaining substantial equilibrium therebetween, while progressively raising the temperature of both liquids and vapors.

10. The process of cracking combustible liquids, which comprises flowing liquids and vapors in parallel from one retort compartment to another, succesively filming the liquids in the presence of all the vapors while counterflowing and integrating the liquids and vapors in each compartment so as to maintain substantial equilibrium therebetween, said vapors constituting residual vapors introduced from preceding compartments and newly formed vapors originating in the successive compartments, and continuously subjecting the filmed liquids and the vapors to cracking temperatures.

11. The process of cracking liquid hydrocarbons which comprises parallel flowing of hydrocarbon liquids and vapors in substantial equilibrium, from one compartment to another of a plurality of successive cracking compartments, filming the liquid hydrocarbons in the successive compartments while counterflowing and integrating the vapors with the liquids in each compartment for maintaining substantial equilibrium, said vapors constituting residual vapors from preceding compartments, mixed with vapors originating in the successive compartments, subjecting the liquids and vapors to cracking temperatures and progressively raising the temperature of the liquids and vapors in parallel through successive compartments.

12. The process of cracking petroleum products, which comprises introducing vapors and liquids from an outside source and flowing them in parallel through cracking compartments, maintaining the liquids and vapors at cracking temperatures and progressively increasing the temperatures thereof from compartment to compartment in parallel, filming the liquids in the successive compartments and integrating the vapors therewith so as to maintain substantial equilibrium therebetween, the vapors in successive compartments constituting residual vapors flowing in parallel from preceding compartments mixed with the vapors originating in the successive compartments.

13. The process of cracking liquid hydrocarbons under equilibrium conditions, substantially as described, which comprises continuously flowing the liquids and vapors in parallel from one cracking compartment to another, successively filming the liquid hydrocarbons in each compartment and integrating the vapors therewith to maintain substantial equilibrium therebetween while subjecting the liquids and vapors to cracking temperatures.

14. The process of cracking hydrocarbons under equilibrium conditions, which comprises flowing hydrocarbon liquids and vapors through a cracking retort from one cracking plate to another, filming the liquid hydrocarbons on the successive cracking plates in the presence of and in intimate contact with all the vapors flowing through and originating in the retort so as to maintain the liquids and vapors in substantial equilibrium and successively subjecting the liquids and associated vapors to cracking temperatures and pressures until the desired composition of vapors is attained, then condensing the vapors.

15. The process of cracking petroleum under equilibrium conditions, substantially as described, which comprises successively filming liquid hydrocarbons in stages, flowing the liquids and vapors thereof from one stage to another, subjecting the liquids and vapors in each stage to cracking temperatures and pressures and maintaining substantial equilibrium therebetween by continuously integrating the liquids and vapors, and subjecting the liquids and vapors to progressively increasing cracking temperatures in successive stages in the direction of flow.

16. The process of cracking petroleum oils in a closed system which comprises flowing liquid hydrocarbons and vapors thereof from one cracking compartment to another, subjecting the liquids in films and thin layers on heated surfaces and the vapors in relatively large volume over the liquids, to cracking temperatures in the successive compartments, integrating the liquids and vapors existing and developing in the successive compartments to establish substantial dynamic equilibrium therebetween as described, and progressively raising the cracking temperature from compartment to compartment to effect controlled decomposition under said equilibrium conditions at predetermined pressures, temperatures and concentrations and according to the heat applied, and the partial pressures developed under said equilibrium conditions in each stage, the process being repeated and continued until the desired composition of vapors is attained, then removing and condensing the vapors.

WILLIAM P. DEPPÉ.
LELAND L. SUMMERS.